Figure 1:
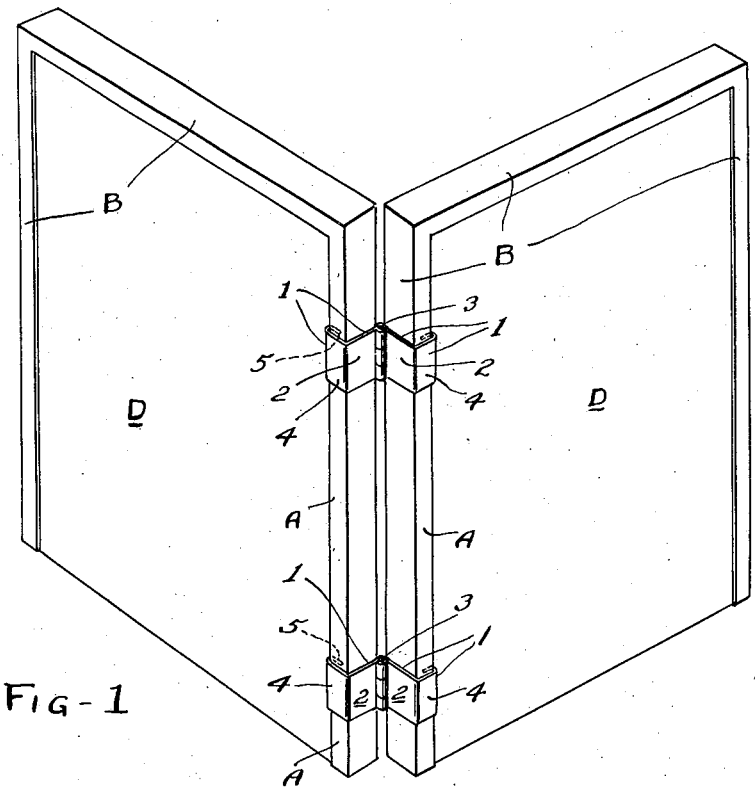

Jan. 9, 1945.   L. TARLITZ   2,367,071
ARTICULATED FRAME
Filed Oct. 15, 1941

INVENTOR.
LEO TARLITZ
BY George M. Soule
Attorney

Patented Jan. 9, 1945

2,367,071

UNITED STATES PATENT OFFICE 2,367,071

ARTICULATED FRAME

Leo Tarlitz, Brooklyn Heights, Ohio

Application October 15, 1941, Serial No. 415,043

3 Claims. (Cl. 40—152.1)

This invention relates to a connector for members such as frames for pictures, mirrors etc., and especially to a readily detachable hinged connector for enabling such members to be stood upright on substantially horizontal surfaces.

Rectangular frames for displaying and preserving photographs and other pictures are commonly made from sheet metal of channel shaped cross section so as to surround the picture and suitable backing and display glass therefor on three sides, the remaining side of the frame being open in order to slidably receive the picture and the rest. The open side is later closed by a filler piece. When two or more such frames are hinged to each other edge-to-edge they can be stood upright safely without any special prop or other support. When sold as connected sets of two or more such frames the same are permanently hinged together. I have found that without having to change the construction of the frames in any way and without subjecting any part thereof to damage, the frames may be connected in pairs or in a series by means requiring no permanent fastening devices and no tools, other than the hands, to enable connection and disconnection as desired.

Figure 2:
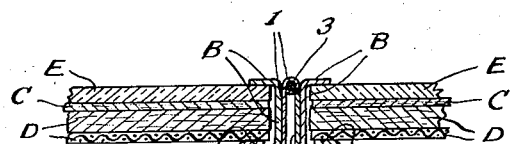
Figure 3:
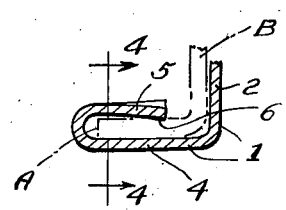
Figure 4:
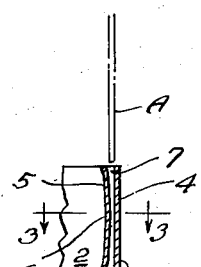

The above indicates the principal objects of the invention. A further object is to provide an improvement in articulated frames for uses such as outlined above. Other objects will become apparent from the following description of the preferred form of the invention, as shown in the drawing, wherein:

Fig. 1 is a perspective view showing the backs of two frames with two of the improved connectors holding the frames together; Fig. 2 is a cross sectional detail view of adjacent edge portions of the two frames connected in accordance herewith; Fig. 3 is an enlarged fragmentary sectional view showing the relationship of connected flange portions of the frame and connector hereof, and Fig. 4 is a sectional detail view taken as at 4—4 Fig. 3, showing a portion of one connector member provided with a frictional detent means and receiving throat for cooperation with an adjacent frame member as described below.

The embodiment of the invention as applied to picture frames made as outlined above—namely of such section (e. g. channels) as provides a rear flange A running along one edge of the assembled unit (e. g. frame B, picture C, filler D and display glass E)—includes two pivotally connected hinge plates or straps 1 with portions 2, adjacent the hinge pin 3, lying parallel to each other in the relative position of the hinge elements shown in Fig. 2. Beyond the portions 2 the hinge plates extend in opposite directions as at 4 to overlap and bear against the flanges A of the connected frames. Beyond the portions 4 respective free end portions of the plates 1 extend inwardly as at 5 to form, with the flange portions 4, hooks with open sides or bights extending toward each other for interlocking engagement with the free edge portions of the rear frame flanges A. To assemble the hinge units onto the frames the hook spaces or bights are simply aligned with the lower free end portions of the frame channel flanges A, as indicated by Fig. 4, and the hooks then slid upwardly therealong to the desired positions. The hinge plate portions 2, by abutment with the webs of the frame channels A, prevent the hooks from becoming detached from the channel flanges A.

It is desirable to provide means for preventing the hinge units from becoming accidentally displaced along the frame flanges A, as by gravity force or careless handling. Therefore the hooks are preferably made so as to provide a restriction narrower than the thickness of the frame flange A at least at some point along each hook in a vertical direction. Thus the hooks have to be sprung apart slightly during assembling of the hinge unit onto the respective frames. Fig. 4 shows the vertically central portion 6 of one of the hook portions 5 relatively indented toward the flange portion 4 for the above mentioned purpose. At one or both edges (vertically) the flanges 5 are flared outwardly providing a frame flange receiving throat as at 7 so that the frame flange A may be readily received into the hooks without having to spread the portions 4 and 5 apart as with a spreading tool.

Since the filler material D such as usually placed behind the photograph or other matter to be exhibited is elastically compressible and fills the space between the back of the photograph and the flanges A of the frames, the filler material may be depended upon to hold the hinge members in place against dislocation along the frame flanges in a vertical direction. In that event the flange and hook portions 4 and 5 could initially engage the flanges A quite loosely for their entire vertical extent, thus facilitating the operation of attaching the hinge units to the frames. In that event the forming operations necessary to provide the flared flange receiving throat (as at 7) and flange gripping restriction (as at 6) could be dispensed with.

After the frames are connected by application of the hinge units thereto, as suggested in Fig. 1, they may be finished by sliding a filling-in channel frame section (not shown) over the lower margins of the glass and backing, following the usual practice in this respect.

The hinge units can be made from any material having the necessary strength—metal being preferred.

Any number of frames may be attached together edge-to-edge in the manner described above. When a pair of frames are so connected they can be folded together face to face for protection of the display glass, the same as can usually be done with hinge-connected picture frames.

In case it is desired to have any two framed pictures arranged to be displayed at diverging angles, then the portions 4, 5 of the hinge units can be applied to the front instead of to the rear frame flanges; in other words the hooks 5 lie between the front flanges and the display glass.

The form of slidably interlocking detachable connection between the frame members would require modification in order to adapt it for other styles of frames than that illustrated. The illustration, as stated above, is simply the preferred arrangement.

I claim:

1. In the combination comprising two frames for pictures or the like adapted to be stood on a horizontal surface, said frames having oppositely directed flanges forming, with adjacent frame elements, channels which are open at one end of each frame, and hinge means comprising pairs of permanently articulated hinge elements for connecting the frames substantially in edge-to-edge relationship for mutual support on such surface; hook means on respective elements of said pairs of hinge elements engaging respective flanges at the open channel ends for demountably associating the hinge means with respective frames in a manner requiring no tools except the hands to connect and disconnect the hinge means and frames.

2. In the combination comprising two frames for pictures or the like substantially in edge-to-edge relationship, said frames having oppositely directed flanges each forming, with adjacent frame elements, a channel open at one end for receiving the picture or the like, and hinge means comprising a pair of mutually pivoted permanently articulated hinge elements for connecting the frames so that the latter can be swung into angular relationship for mutual support on a horizontal surface; hooks on the respective hinge elements and with flange receiving openings directed toward each other in one swung position of said elements whereby slidably to engage respective said flanges of the frames at the open ends of the channels thereof in a vertical direction in a manner demountably to interlock the hinge elements with the frames.

3. In combination with two frames for pictures or the like having flanges the principal planes of which lie substantially parallel to the principal planes of respective frames and extend inwardly from the adjacent edges of the frames, a connecting hinge device having permanently articulated hinge plates extending between the frames and closely adjacent respective frames, said plates having flange portions extending across respective frame flanges and with open hook or bight portions extending toward each other in hooked relationship to the frame flanges thereby to interlock the frames together through the intermediary of the hinge device.

LEO TARLITZ.